United States Patent
Muenst

(10) Patent No.: US 11,358,463 B2
(45) Date of Patent: Jun. 14, 2022

(54) SELF-PROPELLED WORK MACHINE

(71) Applicant: Liebherr-Components Biberach GmbH, Biberach an der Riss (DE)

(72) Inventor: Thomas Muenst, Ummendorf-Fischbach (DE)

(73) Assignee: LIEBHERR-COMPONENTS BIBERACH GMBH, Biberach an der Riss (DE)

( * ) Notice: Subject to any disclaimer, the term of this patent is extended or adjusted under 35 U.S.C. 154(b) by 498 days.

(21) Appl. No.: 15/103,704

(22) PCT Filed: Nov. 26, 2014

(86) PCT No.: PCT/EP2014/003163
§ 371 (c)(1),
(2) Date: Jun. 10, 2016

(87) PCT Pub. No.: WO2015/086114
PCT Pub. Date: Jun. 18, 2015

(65) Prior Publication Data
US 2016/0311310 A1      Oct. 27, 2016

(30) Foreign Application Priority Data

Dec. 11, 2013   (DE) .................... 20 2013 011 046.5

(51) Int. Cl.
*B60K 7/00*      (2006.01)
*B60K 1/02*      (2006.01)
(Continued)

(52) U.S. Cl.
CPC ............ *B60K 7/0007* (2013.01); *B62D 55/06* (2013.01); *B62D 55/12* (2013.01); *H02K 7/116* (2013.01);
(Continued)

(58) Field of Classification Search
CPC .................. B60K 1/02; B60K 7/0007; B60K 2007/0076; B60K 2007/0084; B60K 2007/0061; B62D 55/06
See application file for complete search history.

(56) References Cited

U.S. PATENT DOCUMENTS 1,251,749 A *   1/1918   Cilley ................. B60K 17/046
                                                  180/65.1
1,481,405 A *   1/1924   Anglada ................. B60K 1/02
                                                  180/57
(Continued)

FOREIGN PATENT DOCUMENTS

CN      102233810 A     11/2011
DE      10005527 A1      8/2001
(Continued)

OTHER PUBLICATIONS

ISA European Patent Office, International Search Report Issued in Application No. PCT/EP2014/003163, dated Aug. 21, 2015, WIPO, 3 pages.
(Continued)

*Primary Examiner* — Frank B Vanaman
(74) *Attorney, Agent, or Firm* — McCoy Russell LLP

(57) ABSTRACT

A self-propelled work machine, in particular a tracked vehicle, such as a bulldozer, having a traction drive comprising at least one electric motor for driving at least one chassis wheel, in particular a chain wheel or a sprocket. The motor axis of rotation of the electric motor is arranged displaced and/or angled with respect to the wheel axis of rotation of the chassis wheel to be driven by the electric motor.

18 Claims, 2 Drawing Sheets

(51) Int. Cl.
*H02K 7/116* (2006.01)
*B62D 55/06* (2006.01)
*B62D 55/12* (2006.01)
*E02F 3/76* (2006.01)

(52) U.S. Cl.
CPC .... *H02K 7/1163* (2013.01); *B60K 2007/0046* (2013.01); *B60K 2007/0061* (2013.01); *B60K 2007/0069* (2013.01); *B60K 2007/0076* (2013.01); *B60K 2007/0084* (2013.01); *B60Y 2200/25* (2013.01); *B60Y 2200/411* (2013.01); *E02F 3/76* (2013.01)

(56) References Cited

U.S. PATENT DOCUMENTS

| | | | | |
|---|---|---|---|---|
| 1,543,044 | A * | 6/1925 | Anglada | B60K 1/02 180/384 |
| 1,863,504 | A | 6/1932 | Schmid, Jr. | |
| 3,161,083 | A * | 12/1964 | Roe | B60K 6/365 318/17 |
| 4,270,622 | A * | 6/1981 | Travis | B60K 1/02 180/65.285 |
| 4,919,212 | A * | 4/1990 | McClure | E02F 3/7613 172/274 |
| 4,938,306 | A * | 7/1990 | Sumiyoshi | B60K 17/3505 180/233 |
| 5,098,355 | A * | 3/1992 | Long | B60K 17/16 475/220 |
| 5,704,443 | A * | 1/1998 | Janiszewski | B60K 17/351 180/247 |
| 5,743,347 | A * | 4/1998 | Gingerich | B60L 8/00 180/2.2 |
| 6,615,946 | B2 * | 9/2003 | Pasquini | B60K 1/02 180/248 |
| 7,854,674 | B2 | 12/2010 | Freudenreich | |
| 8,640,800 | B2 | 2/2014 | Armbruster et al. | |
| 2001/0004948 | A1 | 6/2001 | Ruppert et al. | |
| 2002/0074177 | A1 | 6/2002 | Pasquini et al. | |
| 2008/0202826 | A1 | 8/2008 | Freudenreich | |
| 2010/0126786 | A1 | 5/2010 | Stemler et al. | |
| 2011/0259657 | A1 * | 10/2011 | Fuechtner | B60K 6/52 180/65.21 |

FOREIGN PATENT DOCUMENTS

| | | |
|---|---|---|
| DE | 10225730 A1 | 12/2003 |
| DE | 60013340 T2 | 9/2005 |
| DE | 102005045281 A1 | 4/2007 |
| DE | 102010007066 A1 | 8/2011 |
| DE | 102010010438 A1 | 9/2011 |
| EP | 1031452 A2 | 8/2000 |
| EP | 2366576 A1 | 9/2011 |
| WO | 03104067 A1 | 12/2003 |
| WO | 2007033729 A2 | 3/2007 |

OTHER PUBLICATIONS

State Intellectual Property Office of the People's Republic of China, Office Action and Search Report Issued in Application No. 201480074745.0, dated Dec. 28, 2017, 16 pages. (Submitted with Partial Translation).

* cited by examiner

SELF-PROPELLED WORK MACHINE

CROSS REFERENCE TO RELATED APPLICATIONS

The present application is a U.S. National Phase of International Patent Application Serial No. PCT/EP2014/003163, entitled "Self-Propelled Machine," filed on Nov. 26, 2014, which claims priority to German Utility Model Patent Application No. 20 2013 011 046.5, filed on Dec. 11, 2013, the entire contents of each of which are hereby incorporated by reference in their entirety for all purposes.

TECHNICAL FIELD

The present invention relates to a self-propelled work machine, in particular to a tracked vehicle such as a bulldozer, having a traction drive comprising at least one electric motor for driving at least one chassis wheel, in particular a chain wheel or a sprocket.

BACKGROUND AND SUMMARY

With self-propelled work machines such as bulldozers or similar tracked vehicles or also other self-propelled off-road vehicles for construction sites, mines and the like, electric drives having at least one electric motor have been used in more recent times to utilize the typical advantages of such electric drives with respect to hydrostatic drives such as their better efficiency and an easier maintenance. Considerably lower operating costs can also be achieved for the partly substantial powers due to the substantially better efficiency. The electric drive can in this respect in particular be used as a traction drive by means of which at least one chain drive of the chassis is driven. An electric motor can, for example, drive a chain wheel or the sprocket of the chain drive.

In comparison with hydrostatic drives, however, electric motors are a great deal larger with the same output power and thus also have a higher rotary inertia so that more energy has to be used during acceleration procedures. This in turn results in worse efficiency when the energy used for acceleration cannot be reused. The electric motors must in this respect be designed with as little inertia as possible.

Document US 2010/0126786 A1 deals with the inertia of electric motors used in bulldozers and in accordance with said document the inertia of the electric motor should be larger than the inertia of the vehicle, with the ratio of the inertia of the electric motor to the inertia of the vehicle having to be in the region between 1 to 2.5. The electric motor hereby admittedly provides high torque and power. In operation with frequent acceleration processes, the named disadvantages in efficiency result due to the relatively high inertia of the electric motor.

A specific rotor volume is generally necessary with an electric motor to be able to provide a specific power and a specific torque. Since the rotor always has to be designed in the form of a cylinder, the rotor volume is calculated from the length of the cylinder and its basic area which in turn results from a function of the diameter. There are in this respect two possibilities for increasing the rotor volume, namely increasing either the length or the diameter. To keep the mass moment of inertia of the cylindrical rotor as small as possible, the diameter therefore has to be kept as small as possible and the length as large as possible with a given volume. In other words, higher powers and higher torques can be provided by slim, long motors having a small diameter with a simultaneously relatively small moment of inertia.

Such long, slim electric motors are, however, difficult to install in self-propelled work machines such as bulldozers which have a relatively narrow track width, in particular when single wheel drives or single track drives are used in which a respective separate electric motor drives a right wheel and a left wheel or chain wheel since the long, slim electric motors of such single-wheel drive arrangements stand in the way of one another or since there is not sufficient installation space available for such long, slim electric motors.

Starting from this, it is the underlying object of the present invention to provide an improved self-propelled work machine of the initially named type which avoids disadvantages of the prior art and further develops the latter in an advantageous manner. A low-inertia electric drive for relatively narrow-track work machines such as bulldozers should in particular be provided which has low inertia, but which nevertheless provides high power and high torque and which manages with the limited installation space in such work machines.

The named object is achieved in accordance with the invention by a self-propelled work machine having at least one traction drive comprising at least one electric motor for driving at least one chassis wheel, wherein a motor axis of rotation of the electric motor is displaced and/or angled with respect to a wheel axis of rotation of the chassis wheel to be driven by the electric motor.

It is therefore proposed to ease the problems with collisions or space of a long, slim electric motor construction in that the electric motor is no longer installed coaxially to the wheel to be driven, but is rather positioned displaced and/or angled with respect to the wheel axis of rotation and is connected to the wheel to be driven via a gear stage. In accordance with the invention, the motor axis of rotation of the electric motor is arranged displaced and/or angled with respect to the wheel axis of rotation of the chassis wheel to be driven by the electric motor. The named chassis wheel can in this respect be a chain wheel or the sprocket of a tracked chassis or, with a chassis with pneumatic tires, one of the wheels to be driven. The wheel axis of rotation and the motor axis of rotation can in this respect be spaced apart from one another in parallel with one another, can intersect one another at an acute angle, right angle or obtuse angle or can be arranged skewed with respect to one another. Depending on the space or installation space circumstances of the work machine, the longitudinal axis of the electric motor can be oriented such that the available installation space is utilized as well as possible.

A collision of two long, slim electric motors which drive, as a single-wheel drive, two mutually oppositely disposed wheels or chain wheels arranged at different machine sides and/or associated with the same chassis axle can in particular be avoided by the named displaced or angled orientation of the axis of rotation of the electric motor. If such chassis wheels disposed mutually opposite at different machine sides and/or associated with the same chassis axle can be driven by two separate electric motors, the named electric motors can be arranged displaced and/or angled with respect to the respective wheel axis of rotation such that the two electric motors overlap one another viewed transversely to their motor axes of rotation. Such an overlapping electric motor arrangement can in particular be advantageous when the electric motors have a length which is larger than half the track width of the work machine such that the electric motors would collide with one another on a coaxial arrangement with respect to the wheel axis of rotation.

The motor axes of rotation of the electric motors overlapping one another in the named manner can in particular be aligned substantially in parallel with one another and can overlap one another over at least 50% of their longitudinal extents. To achieve a compact motor arrangement with a small axial overlap, the electric motors can preferably overlap one another over substantially their total lengths such that, on a view of the two electric motors transversely to their motor axes of rotation, the total length of the electric motor arrangement, that is the longitudinal extent in parallel with the motor axes of rotation, substantially only corresponds to the length of one electric motor.

To be able to provide sufficient rotor volume and thus a motor design which provides high power and torque with a nevertheless limited, relatively small moment of inertia of the electric motor rotor, the electric motors can each have an axial length which amounts to more than 50%, preferably more than 75%, in particular also more than 80%, of the track width of the work machine. With a tracked vehicle such as a bulldozer, the named track width can mean the spacing of the oppositely disposed chain wheels or sprockets or the spacing of the longitudinal central planes of the two crawler tracks at the right and left at the work machine. With chassis having pneumatic tires, the named track width means the spacing of the oppositely disposed wheels respectively to be driven by the electric motors.

To achieve sufficient capacity, with a simultaneously limited moment of inertia, the electric motor length can be larger than the electric motor diameter or the rotor length can be larger than the rotor diameter. The named electric motor length or rotor length can advantageously amount to approximately 150% to 500%, in particular to approximately 150% to 200%, of the diameter of the electric motor or rotor.

Unlike the initially named prior art, the reduced inertia of the at least one electric motor can be smaller than the reduced inertia of the work machine to be driven, with the reduced inertia of the electric motor on the wheel axis of the wheel to be driven advantageously being able to amount to approximately 0.4 to 1.0, preferably to 0.4 to 0.95, in particular approximately 0.5 to 0.85×the reduced inertia of the work machine.

There are in this respect a plurality of advantageous embodiments for the orientation and arrangement of the electric motors. The motor axis of rotation of the at least one electric motor can in particular be aligned to lie transversely to the direction of travel or to the vertical longitudinal central plane of the work machine and can be arranged displaced with respect to the wheel axis of rotation of the chassis wheel to be driven by the electric motor and/or can be arranged displaced upwardly beyond the height of the wheel axle. The upward displacement of the electric motor can be advantageous to keep the electric motor or its motor shaft free of oil.

If two electric motors are provided in the aforesaid manner which, as a single-wheel drive, drive mutually oppositely disposed chassis wheels or chassis wheels arranged at oppositely disposed machine sides or associated with a common chassis axle, the named electric motors can be displaced to different sides with respect to the wheel axis of rotation in an advantageous further development of the invention. One of the electric motors can in particular be displaced to the front in the direction of travel and the other electric motor can in particular be displaced to the rear in the direction of travel with respect to the respective wheel axis of rotation, with both electric motors advantageously being able to be arranged displaced upwardly beyond the height of the wheel axes of rotation. If the mutually coaxial wheel axes of rotation are viewed from a side, i.e. in the direction of the wheel axis of rotation, one of the electric motors can be arranged, for example, in the region between 9 o'clock and 12 o'clock, in particular between 10 o'clock and 11 o'clock, while the other electric motor can be arranged in the region between 12 o'clock and 3 o'clock, in particular between 1 o'clock and 2 o'clock.

Alternatively or additionally to such a motor arrangement lying transversely to the direction of travel—additionally in as much as a plurality of chassis axles are driven by an electric motor—the motor axis of rotation of the at least one electric motor can also be aligned in parallel with or optionally inclined at a slight acute angle to a vertical longitudinal central plane of the work machine and can be connected to the wheel axis of rotation of the chassis wheel to be driven via a miter gear stage. The motor axis of rotation of the at least one electric motor can advantageously be installed in the work machine lying approximately in parallel with the direction of travel or can be installed in an upright manner.

With single wheel drives for mutually oppositely disposed chassis wheels or chain wheels, the two electric motors can lie, viewed in the direction of travel, arranged at the same level or can also be installed in an upright manner, with the motor axes of rotation of the electric motors being able to be aligned in parallel and being able to overlap substantially completely when viewed transversely to the motor axes of rotation.

The named miter gear stage can in this respect comprise a bevel gear stage such that the motor axis of rotation can intersect the wheel axis of rotation, in particular at a substantially right angle.

Alternatively to such an intersecting axis of rotation arrangement, the motor axis of rotation can, however, also be arranged skewed with respect to the wheel axis of rotation, with the named miter gear stage here being able to comprise a hypoid gear stage. Such a hypoid gear stage or a vertical or transverse displacement of the motor axis of rotation which can thus be achieved with respect to the wheel axis of rotation can in particular be of advantage with a lying arrangement of the electric motor to be able to set the electric motor upwardly with respect to the wheel axis of rotation in order to gain more ground clearance, on the one hand, and to avoid a collision with further machine components arranged in the vertical region of the wheel axle such as the generator or the internal combustion engine driving the generator.

The present invention will be explained in more detail in the following with respect to preferred embodiments and to associated Figs.

DETAILED DESCRIPTION

Figure 1:
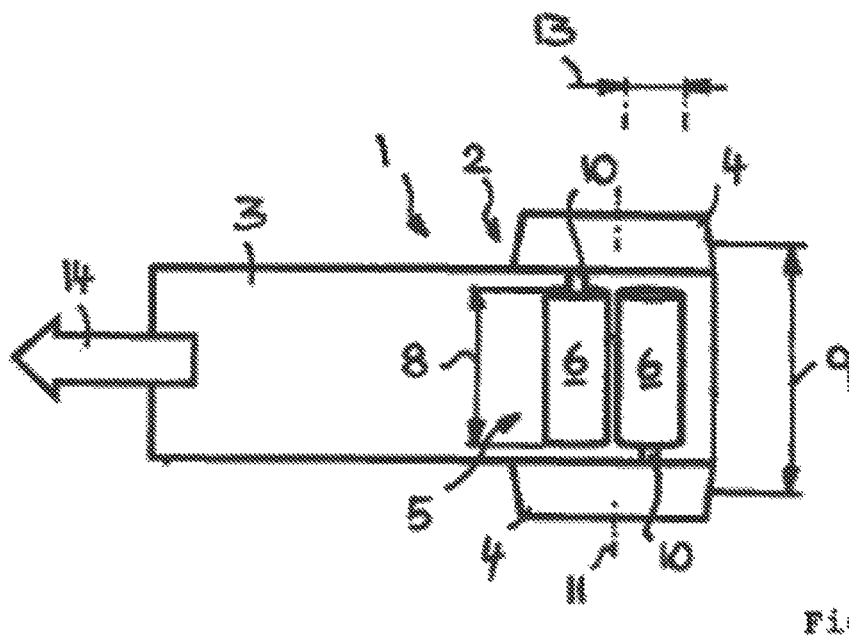
FIG. 1 shows a schematic plan view of a self-propelled work machine in the form of a bulldozer in accordance with a first embodiment of the invention in which the electric motors driving the oppositely disposed chassis wheels are aligned lying transversely to the direction of travel.

The self-propelled work machine only shown schematically in FIG. 1 can, for example, be a tracked vehicle, in particular a bulldozer 1, whose chassis can be formed as a tracked chassis 2 having a respective crawler track at the right and at the left of the machine body 3. The named crawler tracks can in this respect each be driven by means of a chassis wheel 4, in particular in the form of a chain wheel or of a sprocket, with the chassis wheels or chain wheels to be driven being able to be arranged mutually opposite at different sides of the machine body 3 such that they form a common chassis axis, cf. FIG. 1.

The travel drive 5 in this respect comprises single-wheel drives each having at least one electric motor 6 for driving a respective one of the named chassis wheels 4, with the named electric motors 6 being able to be connected to the respective chassis wheel 4 while interposing a gear stage.

As FIG. 1 shows, the named electric motors 6 are formed in a long slim manner of construction with a relatively small diameter, but with a large axial length, such that the electric motors 6 extend beyond the longitudinal central plane of the machine body 3. The axial length 8 of the electric motors 6 can be larger than half the track width 9 of the bulldozer 1.

In order nevertheless to have no collision between the two electric motors 6 with a lying alignment of the electric motors 6 oriented transversely to the direction of travel, the two electric motors 6 are not arranged coaxially with the respective chassis wheels 4 to be driven, but rather displaced in parallel therewith. The motor axis of rotation 10 of one of the electric motors 6 can in particular be displaced to the front in the direction of travel with respect to the wheel axis of rotation 11 of the chassis wheel 4 to be driven by the electric motor 6 and the other electric motor 6 can be displaced correspondingly to the rear in the direction of travel, cf. FIG. 1 such that the two electric motors 6 come to lie next to one another substantially in parallel with one another, cf. FIG. 1.

Figure 2:
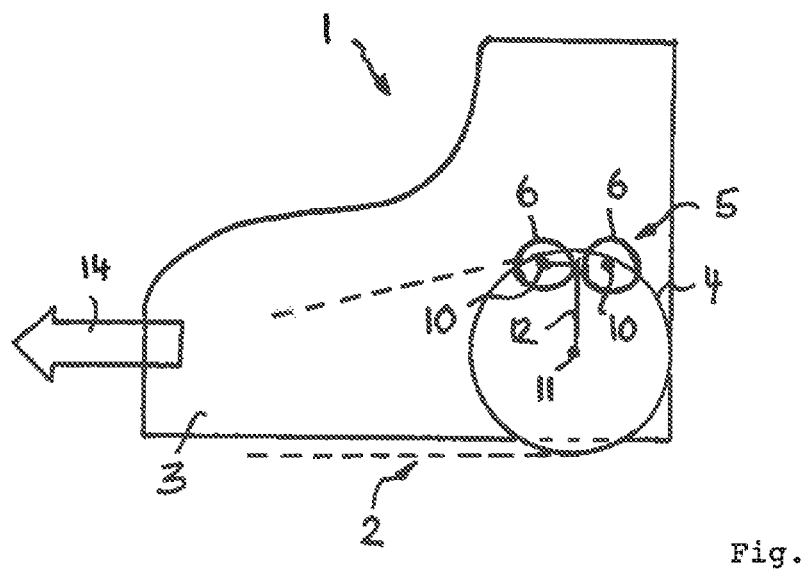
FIG. 2 shows a side view of the work machine of FIG. 1 which shows the vertical position of the electric motors of FIG. 1 relative to the chassis wheel to be driven.

As FIG. 2 shows, the motor axes of rotation 10 of the electric motors 6 can in this respect be arranged displaced upwards beyond the level of the wheel axes of rotation 11. Such a vertical displacement of the electric motors 6 with respect to the wheel axes of rotation 11 can be advantageous to keep the electric motors 6 or their shafts free of oil.

The displacement of the motor axes of rotation 10 with respect to the wheel axes of rotation 11 can be bridged by a suitable gear stage 12, for example in the form of a spur gear stage.

Figure 3:
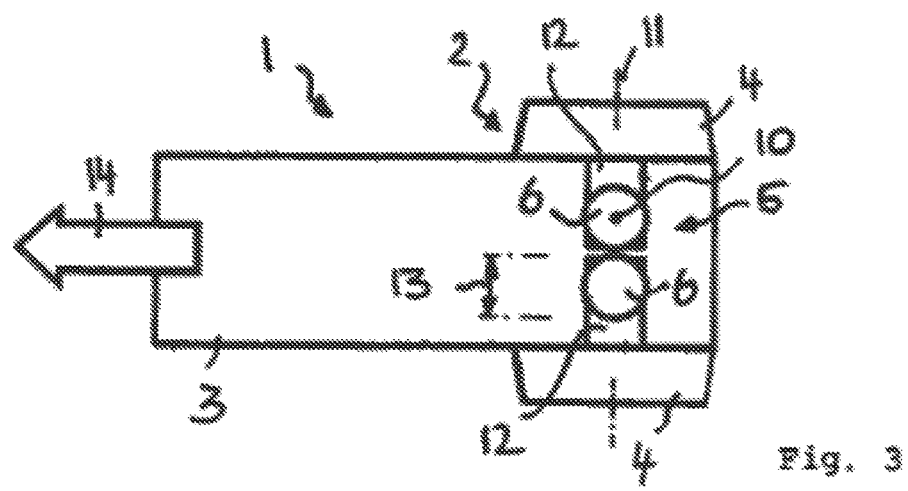
FIG. 3 shows a plan view of a work machine similar to FIG. 1 in accordance with a further embodiment of the invention in which the electric motors are positioned in an upright arrangement and are connected to the chassis wheels to be driven via a bevel gear stage.

As FIG. 3 shows, the electric motors 6 can also be arranged in an upright orientation, advantageously approximately in parallel with a vertical longitudinal central plane through the machine body 3 and/or substantially directly above the mutually aligned wheel axes of rotation 11 of the chassis wheels 4 such that the motor axes of rotation 10 intersect the wheel axes of rotation 11, in particular at a substantially right angle.

The electric motors 6 or their motor axes of rotation 10 can be connected to the chassis wheels 4 to be driven via a miter gear stage 12, in particular in the form of a bevel gear stage.

Figure 4:
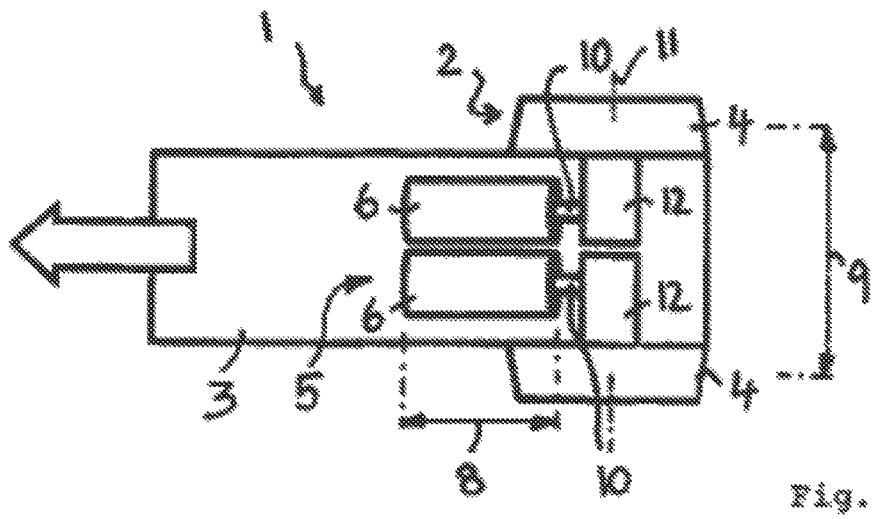
FIG. 4 shows a plan view of a work machine similar to FIGS. 1 and 3 in accordance with a further embodiment of the invention in which the electric motors are arranged lying in parallel with the direction of travel and are vertically offset with respect to the wheel axles via a hypoid gear stage.

As FIG. 4 shows, the electric motors 6 can also be aligned lying, in particular approximately in parallel with the direction of travel, or can be positioned in a lying orientation approximately in parallel with a vertical longitudinal central plane through the machine body 3. The motor axes of rotation 10 of the electric motors 6 can in this respect in turn advantageously be arranged in parallel with one another and/or can be arranged lying next to one another such that they overlap one another substantially completely transversely to the motor axis of rotation 10.

In the lying orientation in parallel with the direction of travel of the electric motors 6 shown in FIG. 4, the electric motors 6 can be arranged at the level of the wheel axes of rotation 11 or the motor axes of rotation 10 can intersect the wheel axes of rotation 11, with the electric motors 6 in this case being able to be connected to the respective chassis wheel 4 via a respective bevel gear stage 12.

Figure 5:
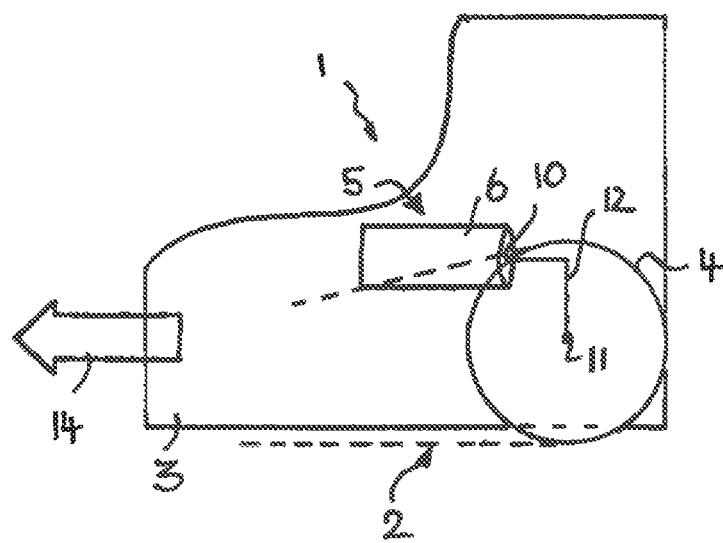
FIG. 5 shows a side view of the work machine of FIG. 4 which shows the vertical displacement of the electric motor axis of rotation with respect to the wheel axis of rotation.

Alternatively to such a motor arrangement at the same level with the wheel axes of rotation 11, the electric motors 6 can also be arranged vertically displaced with respect to the wheel axes of rotation 11, in particular upwardly displaced beyond the level of the wheel axes of rotation 11, to increase the ground clearance in the region of the electric motors 6 and/or to avoid their collision potential with other machine components such as a generator disposed in the vertical region of the wheel axes. With a vertically displaced motor arrangement as shown in FIG. 5, the electric motors 6 can be connected to the respective chassis wheel 4 by means of a hypoid gear stage 12.

Without it being shown in the drawings, the electric motors 6 can optionally also be positioned in an arrangement inclined at an acute angle with respect to the vertical and to the horizontal, for example in an orientation approximately in parallel with a vertical longitudinal central plane through the machine body 3 such that the electric motor arrangement would so-to-say form a mixed form between FIG. 3 and FIG. 4.

The invention claimed is:

1. A self-propelled work machine having at least one traction drive comprising at least one electric motor for driving at least one chassis wheel,
    wherein a motor axis of rotation of the electric motor is displaced and/or angled with respect to a wheel axis of rotation of the chassis wheel to be driven by the electric motor,
    wherein each of the at least one electric motor has an axial length which amounts to more than 50% of a track width of the work machine,
    wherein the track width is a distance between two chassis wheels of the work machine, and
    wherein the two chassis wheels are on opposite sides of a body of the work machine, and
    wherein a moment of inertia of the at least one electric motor to a moment of inertia of the work machine is 0.4 to 0.95.

2. The self-propelled work machine in accordance with claim 1, wherein the work machine is a bulldozer, and wherein the at least one traction drive is formed as a single-wheel drive or as single-wheel drives.

3. The self-propelled work machine in accordance with claim 1, wherein chassis wheels disposed mutually opposite at different machine sides and/or associated with a same chassis axle are driven by two separate electric motors which are arranged overlapping one another as viewed transversely to the motor axes of rotation.

4. The self-propelled work machine in accordance with claim 3, wherein the motor axes of rotation of the electric motors are aligned in parallel with one another, and wherein the two separate electric motors overlap one another over at least 50% of their longitudinal extents as viewed transversely to the motor axes of rotation.

5. The self-propelled work machine in accordance with claim 4, wherein the two separate electric motors are aligned in parallel with one another and overlap one another over 100% of their longitudinal extents.

6. The self-propelled work machine in accordance with claim 3, wherein the motor axis of rotation of each of the two separate electric motors is oriented lying transversely to a direction of travel and is arranged displaced in the direction of travel with respect to wheel axes of rotation of the chassis wheels to be driven by the two separate electric motors.

7. The self-propelled work machine in accordance with claim 6, wherein one of the two separate electric motors is arranged displaced to the front in the direction of travel with respect to the wheel axes of rotation and the other electric motor of the two electric motors is arranged displaced to the rear in the direction of travel with respect to the wheel axes of rotation.

8. The self-propelled work machine in accordance with claim 7, wherein both of the two separate electric motors are arranged displaced upwardly beyond a level of the wheel axes of rotation; and wherein both of the two separate electric motors are oriented perpendicular to a vertical longitudinal central plane of the work machine.

9. The self-propelled work machine in accordance with claim 3, wherein the two separate electric motors are each aligned in parallel with a vertical longitudinal central plane of the work machine.

10. The self-propelled work machine in accordance with claim 9, wherein the two separate electric motors are oriented in an upright manner.

11. The self-propelled work machine in accordance with claim 10, wherein the two separate electric motors are aligned in parallel with one another and are arranged standing next to one another directly above wheel axes of rotation of the oppositely disposed chassis wheels, wherein the motor axes of rotation intersect the wheel axes of rotation at a right angle.

12. The self-propelled work machine in accordance with claim 1, wherein the at least one electric motor has a length in a range from 100% to 500% of a diameter of the at least one electric motor.

13. The self-propelled work machine in accordance with claim 1, wherein the motor axis of rotation of the at least one electric motor is aligned in parallel with a vertical longitudinal central plane of the work machine and is connected to the chassis wheel to be driven via a miter gear stage; and wherein the at least one electric motor is directly above the wheel axis of rotation.

14. The self-propelled work machine in accordance with claim 13, wherein the miter gear stage comprises a bevel gear stage, and wherein the motor axis of rotation intersects the wheel axis of rotation at a right angle.

15. The self-propelled work machine in accordance with claim 13, wherein the miter gear stage comprises a hypoid gear stage and the motor axis of rotation is displaced vertically with respect to the wheel axis of rotation of the chassis wheel to be driven by the at least one electric motor.

16. The self-propelled work machine in accordance with claim 15, wherein the miter gear stage is set higher with respect to the wheel axis of rotation of the at least one chassis wheel to be driven by the at least one electric motor.

17. The self-propelled work machine in accordance with claim 1, wherein the work machine is a tracked vehicle, and wherein the at least one chassis wheel is a chain wheel or a sprocket.

18. A self-propelled work machine having at least one traction drive comprising at least one electric motor for driving at least one chassis wheel, wherein a motor axis of rotation of the electric motor is angled with respect to a wheel axis of rotation of the chassis wheel to be driven by the electric motor, and wherein a moment of inertia of the at least one electric motor to a moment of inertia of the work machine is 0.4 to 0.95.

* * * * *